Dec. 7, 1954  J. L. STRATTON  2,696,587
ELECTRIC REGULATOR
Filed Jan. 30, 1945
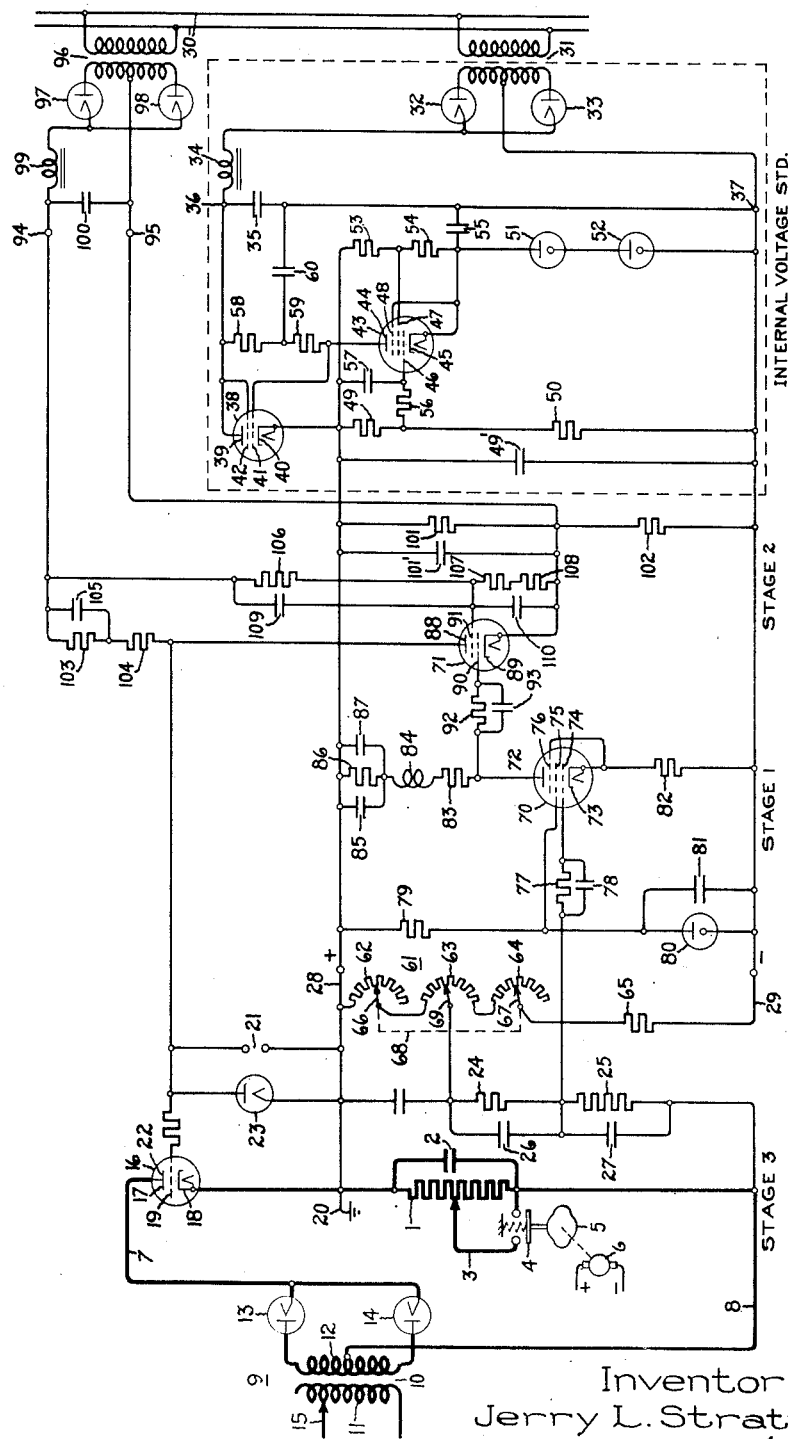
Inventor:
Jerry L. Stratton,
by Harry E. Dunham
His Attorney.

& nbsp;

2,696,587

ELECTRIC REGULATOR

Jerry L. Stratton, Schenectady, N. Y., assignor to General Electric Company, a corporation of New York Application January 30, 1945, Serial No. 575,247

8 Claims. (Cl. 323—22)

My invention relates to an electric regulator or stabilizer and more particularly to an electric regulator utilizing electronic tubes for maintaining within very narrow limits an electrical condition of a load circuit irrespective of variations of the load or voltage of the source of supply.

Recent developments of electric apparatus utilizing high direct current voltage of the order of scores of kilovolts have presented new problems in connection with suitable supply and regulating equipment. Some of these developments require that the voltage regulation of the high voltage load circuit be of the order of one part in several thousand, or a percentage regulation of the order of 0.0004, under conditions of a highly fluctuating load and occasional momentary short circuits. Various regulators or stabilizers of the electronic tube type have been proposed or utilized in the past for relatively lower voltage radio transmitters and receivers, but these devices do not possess many of the characteristics required for the apparatus referred to above.

It is an object of my invention to provide a new and improved electric regulator.

It is another object of my invention to provide a new and improved electric regulator including an electronic tube which controls the voltage supplied to a high voltage direct current load circuit.

It is a further object of my invention to provide a new and improved electric regulator which provides a voltage regulation of the order of one part in several thousand in a fluctuating direct current load circuit having an adjustable voltage range of the order of 20 to 40 kilovolts.

My invention will be better understood from the following description taken in connection with the accompanying drawing in which the single figure illustrates one embodiment thereof, and its scope will be pointed out in the appended claims.

Referring now to the drawing, I have represented my invention as applied to an electronic tube regulator for controlling the voltage of a load device which is represented by a resistor 1 and which may be a load of a fluctuating character and subject to random momentary short circuits. A capacitor 2 may be connected in parallel with the load device 1 to suppress oscillations. The fluctuating character of the load is simulated, solely for purposes of illustration, by means of a shunt circuit 3 connected across a portion of resistor 1 and which is arranged to be closed and opened periodically by a contact 4 shown as being reciprocated by a rotatable cam 5 driven by a motor 6. The load circuit 1 is energized from a high voltage direct current supply circuit comprising a positive conductor 7 and a negative conductor 8. The direct current circuit is energized by a suitable high voltage rectifier 9 which, as illustrated, comprises a transformer 10 having a primary winding 11 and a secondary winding 12 connected through a pair of electronic tubes 13 and 14 arranged for bi-phase half wave rectification, although any suitable form of rectifier may be chosen. If it is desired to adjust the voltage level of the load circuit 1, voltage adjusting means such as known types of a tap-changing device or an induction regulator may be used and I have indicated such means by the voltage adjusting means 15 introduced in circuit with the primary winding 11.

An electrical condition, such as the voltage of the load circuit 1, is controlled by means of an electronic tube 16 having an anode 17, a cathode 18 and a control electrode or grid 19. The electronic tube 16 is preferably of the high vacuum type and serves as a variable impedance connected between the supply circuit conductors 7 and 8 and the load circuit 1 to cause a constant voltage to be impressed across the load circuit when regulated in accordance with my invention. For simplicity of illustration, I have omitted the cathode heating supply for the tube 16 and also for the other tubes of the regulating circuit although it will be obvious that such means will be furnished in the well known manner. However, for tube 16 it is preferable to ground the cathode, as indicated at ground 20, and to adjust the cathode heating or filament supply so that this tube will be emission limited during short circuit conditions of the load with the emission limit, of course, higher than the maximum load current. During short circuits the tube 16 may ionize, in which case high voltage surges would occur on the grid 19. In order to suppress and protect against these surges a spark gap 21 may be connected through a resistor 22 between the grid 19 and ground 20 and a unidirectional device 23 poled in a direction opposite to normal grid-cathode current flow may be connected in parallel to spark gap 21.

In order to obtain an electrical quantity which indicates a deviation of the voltage across load circuit 1 from the level which has been set by device 15, I connect a voltage divider across load circuit 1 comprising resistors 24 and 25. In an operating embodiment of the invention where the load voltage is adjustable between 22 to 35 kilovolts, I have found that resistor 25 is preferably of the order of 70 times the value in ohms of the resistor 24. Each of the voltage divider resistors 24 and 25 has capacitors 26 and 27 connected, respectively, thereacross in order to maintain the correct transient division of voltage, although distinct capacitors as such may not be needed if the voltage divider is designed to have the desired internal capacitance by construction. I then select the portion of the divider voltage across resistor 24 and compare it with an internal voltage standard in the regulator circuit to be described presently to obtain a difference voltage which is amplified and used to control the grid of tube 16 and thereby minimize any deviation between the load voltage and the internal standard voltage against which it is compared.

The voltage provided by the internal voltage standard is impressed across a bus conductor 28, which is grounded at point 20 and constitutes the positive conductor of the standard and a bus conductor 29 which constitutes the negative conductor. The source of supply for the internal voltage standard may be an alternating voltage supply circuit 30 of 115 volts, 60 cycle and while a variation in this voltage of ±5 volts is permissible, it is preferable if this supply can be maintained within ±1 per cent. The alternating voltage from circuit 30 is stepped up by a transformer 31 and rectified by any suitable rectifier arrangement indicated by the electronic tubes 32 and 33 arranged for bi-phase half wave rectification. The output of the rectifier is transmitted through a conventional and suitable filter diagrammatically illustrated as comprising the series inductance 34 and shunt capacitor 35. The output terminals of the rectifier are indicated by the numeral 36 for the positive terminal and numeral 37 for the negative terminal. The negative terminal 37 is connected to the bus 29 which, as previously stated, constitutes the negative bus conductor of the regulator circuit. The positive terminal 36 is conected through a series regulating electronic tube 38 to the positive bus 28 of the regulator circuit. The tube 38 is provided with an anode 39, a cathode 40, a control grid 41 and a screen grid 42. Screen grid 42 is connected to the anode. The regulating tube 38 serves as a variable impedance element in a manner similar to tube 16 and is controlled by an amplifying tube 43 by direct coupling. Tube 43 is preferably a pentode tube of the high vacuum type and is provided with an anode 44, a cathode 45, a control grid 46, a screen grid 47 and a suppressor grid 48. A voltage divider comprising resistors 49 and 50 is connected across the regulated supply conductors 28 and 29. A capacitor 49' is connected in parallel with the series connected resistors 49 and 50 to suppress residual ripple of the output voltage of the voltage standard. Two voltage regulating tubes 51 and 52, which are illustrated as of the glow discharge type, are connected in series relation across the regulated supply conductors 28 and 29 in series with two series connected resistors 53 and 54. The cathode 45 of tube 43 is connected to the junction between resistor 54 and glow discharge tube 51 and the voltage at this point is maintained constant at some predetermined value with respect to conductor 29 by the action of the voltage regulating tubes 51 and 52. A capacitor 55 is connected in parallel with the tubes 51 and 52 to act as a bypass and filter. The control grid 46 of tube 43 is connected through a protective resistor 56 to the junction between the voltage divider resistors 49 and 50. A capacitor 57 is connected between the control grid 46 of tube 43 and the conductor 28 to influence grid 46 to compensate for residual ripple that would not otherwise be suppressed by tubes 38 and 43. The screen grid 47 of tube 43 is connected to a potential positive with respect to cathode 45 at the junction of resistors 53 and 54 and the suppressor grid 48 is connected to the cathode in a conventional manner.

The anode of tube 43 is connected to the positive terminal 36 of the rectifier circuit through series resistors 58 and 59, and a capacitor 60 is connected between the junction of these resistors and the negative terminal 37 of the rectifier forming a bypass and filter. The grid 41 of the series regulating tube 38 is directly connected to the anode 44 of the amplifier tube 43 so that the amplified deviation of the voltage between the grid and cathode of tube 43 is applied to the grid 41 of tube 38 to maintain the voltage between conductors 28 and 29 constant at the desired value.

For the purpose of adjusting the voltage setting of the regulator, I provide a variable voltage divider 61 connected across the conductors 28 and 29 of the internal voltage standard. The voltage divider 61 comprises in series relation variable resistors 62, 63 and 64 and a fixed resistor 65. The variable resistors 62 and 64 are provided with adjustable arms 66 and 67, respectively, which arms may be operated simultaneously by any convenient means as indicated by the dotted line 68. The resistors 62 and 64 are designed primarily for fine adjustments and may have a resistance of the order of ⅛ to 1/10 of the resistor 63. The resistor 63 which is designed for the coarser steps of adjustment is also provided with an adjustable arm 69 which is connected to the top of resistor 24 constituting the low resistance section of the load voltage divider.

The regulating circuit comprises a three-stage direct-coupled amplifier circuit including the load circuit power tube 16 previously described, and two amplifier tubes 70 and 71 preferably of the high vacuum type. Tube 70 and its control circuits may be referred to as the first stage of the regulator. The tube 70 comprises an anode 72, a cathode 73, a control grid 74, a screen grid 75 and a suppressor grid 76. The difference between the voltage across the low resistance section 24 of the load voltage divider and a portion of the voltage across resistors 63, 64 and 65 of the internal voltage standard is applied between the grid 74 and the cathode 73 of tube 70. A resistor 77 is connected in series relation with grid 74 and a capacitor 78 is connected in shunt with this resistor to bypass high frequencies and improve the frequency response of this stage of the amplifier. The screen grid 75 is connected to the junction between a resistor 79 and a voltage regulating tube 80 of the glow discharge type connected in series relation across the internal voltage standard bus 28—29. The tube 80 has connected in shunt therewith a by-pass capacitor 81 and maintains a stiff screen grid supply so as to protect the screen grid circuit against overloading under certain abnormal conditions and also to give the circuit the proper "overshoot" after short circuits across the load. This latter function will be described in more detail when the operation of the circuit is considered. The suppressor grid 76 is connected to the cathode 73 in a conventional manner. The anode-cathode circuit of tube 70 is connected across the internal voltage standard conductors 28—29 with a resistor 82 connected between cathode 73 and the negative conductor 29. The anode 72 is connected to the positive conductor 28 through a series circuit comprising a resistor 83, an inductance choking coil 84 and an impedance comprising in parallel relation a capacitor 85, a resistor 86 and a capacitor 87. The combination of impedance elements between the anode 72 and the positive bus are chosen to give this first stage of the amplifier the proper frequency characteristics to prevent oscillation and yet allow high amplification of direct current.

The second stage of the main regulator includes the tube 71 which is provided with an anode 88, a cathode 89, a control grid 90 and a screen grid 91. The control grid of tube 71 is directly coupled to the previous stage through a resistor 92 to the junction of the anode connection and resistor 83. A by-pass capacitor 93 is connected in shunt to resistor 92. Tube 71 has a separate anode-cathode supply comprising a positive conductor 94 and a negative conductor 95. The source of supply for the conductors 94 and 95 may comprise any suitable rectifier circuit which, as illustrated, comprises a transformer 96 connected to be energized from the circuit 30 and two tubes 97 and 98 connected for bi-phase half-wave rectification with a suitable filter in the output circuit diagrammatically represented by the series reactor 99 and shunt capacitor 100. The negative terminal 95 of this source of anode supply is connected to the junction of two resistors 101 and 102 connected in series relation across the internal voltage standard conductors 28 and 29. A by-pass capacitor 101' is connected in shunt to resistor 101. The values of the resistors 101 and 102 are so chosen that the junction point thereof will have a predetermined positive potential relative to conductor 29. The anode circuit of tube 71 is provided with anode loading resistors 103 and 104 connected in series relation with the anode 88 of tube 71 and the output terminal 94 of the rectifier supply means. The resistor 103 is provided with a by-pass capacitor 105 to reduce the amplification at high frequencies. The screen grid of tube 71 is supplied from a voltage divider connected across the rectifier supply conductors 94 and 95 and comprises in series relation resistors 106, 107 and 108. A by-pass capacitor 109 is connected in shunt to resistor 106 and a by-pass capacitor 110 is connected in shunt to resistors 107 and 108. The screen grid 91 of tube 71 is connected to the junction of resistors 106 and 107 of this voltage divider.

The third stage of the main regulator comprises the load regulating tube 16 which has been previously described. The grid 19 of this tube is connected to the junction of anode 88 of the second stage tube 71 and the anode loading resistor 104 so that tube 16 may regulate the voltage from the high voltage rectifier 9 in the desired manner.

The operation of the illustrated embodiment of my invention is substantially as follows: The component of voltage across resistor 24 acting alone would bias the grid 74 of tube 70 negative whereas the component of voltage across the portion of the internal voltage standard 61 acting alone would bias the grid 74 positive. Since the difference voltage of these two components of voltage is impressed upon the grid 74, it will be evident that a tendency for the load voltage to increase would make grid 74 more negative and thereby decrease the anode-cathode current of the first stage tube 70. With a decrease in the anode-cathode current of tube 70 through anode resistor 83, the grid 90 of the second stage tube 71 would become less negative and thereby effect an increase in the anode-cathode current of tube 71 through the anode loading resistors 103 and 104. This increase of current through resistors 103 and 104 makes the grid 19 of tube 16 more negative and thereby increases the impedance of the tube and compensates for the tendency of the load voltage to increase beyond the increment of voltage necessary to effect the regulating action. It will be evident that a reverse operation takes place for a decrease in the voltage of the load circuit.

The internal voltage standard regulator with two stages of amplification operates in accordance with the same principles as the main regulator. Any variation of the voltage across the conductors 28 and 29 of the internal voltage standard is impressed upon grid 46 of tube 43 from the junction of voltage divider resistors 49 and 50. This variation in voltage changes the anode-cathode current of tube 43 and thereby the current through the resistors 58 and 59 so as to vary the potential of the grid of the series regulating tube 38 in a manner to maintain the voltage of conductors 28 and 29 at the desired value. For example, if the voltage of the conductors 28 and 29 tends to increase, the potential of the cathode 45 is maintained at a substantially constant value above the negative conductor 29 by the glow discharge tubes 51 and 52, and the potential of control grid 46 tends to rise thereby increasing the anode-cathode current of tube 43 through resistors 58 and 59. This increase of current makes the grid 41 of the series regulating tube 38 more negative and thereby increases the impedance of tube 38 to compensate for the tendency of the voltage of bus 28—29 to increase. The connection of the screen grid 47 of tube 43 to the junction of resistor 54 and glow tube 51 accentuates the regulating action of the amplifier tube 43 since the entire increment or decrement of the voltage of circuit 28—29 is impressed upon the screen grid. It will be evident that a reverse operation takes place for a decrease in the voltage across the conductors 28—29 of the internal voltage standard.

During the momentary short circuit of the load device 1 the grid 74 of the first stage amplifier tube 70 becomes positive since the component of voltage from section 24 of the load voltage divider drops to zero or at least below the value of the opposing component of voltage from voltage divider 61 of the internal voltage standard. This causes the tube 70 to be fully conductive and if the screen grid potential were maintained, the screen grid would draw an excessive current. With the arrangement provided for the screen grid excitation, when the screen grid current increases beyond a predetermined value the voltage across the glow tube 80 is decreased and this tube ceases to glow and the screen grid potential is decreased. Upon termination of the short circuit, the potential of control grid 74 is again dependent upon the difference between the component of voltage derived from the load voltage divider resistor 24 and the internal voltage divider 61 and becomes less positive so that the voltage of the load would return to normal except for the fact that glow tube 80 is not sustaining the voltage of screen grid 75. The glow tube 80 requires an overvoltage to re-ionize or start its glow and this contributes to an "overshoot" in the high voltage across the load before the voltage regulator returns to normal action and the load voltage returns to normal. This is a desired characteristic for the type of load discussed.

While I have shown and described a particular embodiment of my invention, it will be obvious to those skilled in the art that many changes and modifications can be made without departing from my invention, and I, therefore, aim in the appended claims to cover all such changes and modifications as fall within the true spirit and scope of my invention.

What I claim as new and desire to secure by Letters Patent of the United States is:

1. A high voltage direct current power supply system having output terminals and comprising a high voltage source of direct current connected in series relation with a variable impedance electronic tube across said output terminals, said electronic tube being provided with a control electrode, means for deriving a component of control voltage variable in accordance with variations in the voltage of said output terminals, a separate regulated source of reference voltage including a controlled electronic tube connected to be responsive to any variation of the voltage of said separate source from a predetermined value, means for deriving a component of voltage of constant magnitude from said separate source of reference voltage, and means responsive to the difference between said components of voltage for varying the impedance of said first mentioned electronic tube so as to compensate for any variations of said load voltage from a predetermined value.

2. In a voltage regulating system for a source of high voltage direct current, a load device connected to be energized from said source, a variable impedance regulating electronic tube interposed in series relation between said source and said load device, means for deriving a component of voltage variable in accordance with the voltage of said load device, a separate regulated source of reference voltage including a controlled electronic tube connected to be responsive to any variation of the voltage of said separate source from a predetermined value, means for deriving a component of voltage of constant magnitude from said separate source, and means responsive to the difference between said components of voltage for varying the impedance of said first mentioned electronic tube so as to compensate for any variations of said load voltage from a predetermined value.

3. In a voltage regulating system for a source of high voltage direct current, a load device connected to be energized from said source, a variable impedance regulating electronic tube having a control electrode and interposed in series relation between said source and said load device, means for deriving a component of voltage variable in accordance with the voltage of said load device, a separate regulated source of constant reference voltage including a controlled electronic tube connected to be responsive to any variation of the voltage of said separate source from a predetermined value, means for deriving a component of voltage of constant magnitude from said separate source, and means comprising a direct current amplifier having an input circuit connected to be energized in accordance with the difference between said components of voltage and an output circuit connected to the control electrode of said first mentioned regulating electronic tube so as to compensate for any variation of the voltage of said load circuit from a predetermined value.

4. In a voltage regulating system for a source of high voltage direct current, a load device connected to be energized from said source, a variable impedance regulating electronic tube having a control electrode and interposed in series relation between said source and said load device, a voltage divider resistor connected across said load device for deriving therefrom a component of voltage variable in accordance with the voltage of said load device, a separate regulated source of constant reference voltage, a voltage divider resistor connected across said separate source for deriving therefrom a component of voltage of constant magnitude, an additional separate source of direct current voltage, a two stage direct current amplifier comprising a pair of electronic tubes one tube of which is provided with a control grid and an anode-cathode circuit connected to be energized from said separate regulated source and the other tube of which is provided with a control grid and an anode-cathode circuit connected to be energized from said additional separate source, means for connecting the control grid of the electronic tube of said first stage for energization in accordance with the difference between said components of voltage, and means for connecting the control electrode of said regulating tube for energization in accordance with the variations in the anode-cathode current of the electronic tube of said second stage so as to compensate for any variation in the voltage of said load circuit.

5. In combination, a direct current supply circuit, a direct current load circuit, a variable impedance electronic tube connected between said circuits for controlling the voltage of said load circuit and comprising a pair of principal electrodes and a control grid, a first voltage divider comprising a resistor connected across said load circuit for producing a voltage proportional to a fraction of the voltage of said load circuit, a pair of voltage reference conductors, means for energizing said conductors with a regulated constant unidirectional voltage, a second voltage divider connected across said pair of conductors, a first control electronic tube connected across said pair of conductors and having an anode, a cathode and a control grid, means for impressing upon the control grid of said first control electronic tube the difference between the voltage components derived from said first and second voltage dividers, a second separate source of unidirectional voltage having positive and negative terminals, a second control electronic tube connected across said second source of unidirectional voltage and having an anode, a cathode and a control electrode, a resistor connected between the anode of said second control electronic tube and the positive conductor of said second source, and means for connecting the control grid of said first mentioned electronic tube to the junction between said resistor and the anode of said second control electronic tube.

6. In a voltage regulating system, a direct current supply circuit, a direct current load circuit, a variable impedance regulating electronic tube having a control electrode and interposed in series relation between said circuits, a voltage divider resistor connected across said load circuit for deriving therefrom a component of voltage variable in accordance with the voltage of said load circuit, a pair of constant voltage reference conductors, a supplementary source of direct current for energizing said reference conductors, means including a supplementary variable impedance regulating electronic tube having a control grid and interposed in series relation between said supplementary source and said pair of reference conductors, a voltage divider resistor connected across said pair of reference conductors for deriving therefrom a component of voltage proportional to the voltage of said voltage reference conductors, a direct current amplifier including an electronic tube having an input circuit connected to the voltage divider across said reference conductors and an output circuit connected to the control grid of said supplementary electronic tube so as to maintain the voltage of said reference conductors at a substantially constant value, a two-stage direct current amplifier including in each stage an electronic tube having an anode, a cathode and a control electrode and having an input circuit for said first stage and an output circuit for said second stage, the electronic tube of said first stage having its anode-cathode circuit connected across said pair of voltage reference conductors, means for energizing the input circuit of said two-stage amplifier in accordance with the difference between said derived components of voltage, and means for connecting the control electrode of said first mentioned regulating electronic tube for energization in accordance with an electrical characteristic of the electronic tube of said second stage so as to compensate for any variation in the voltage of said load circuit.

7. In a voltage regulating system, a direct current supply circuit, a direct current load circuit, a variable impedance regulating electronic tube having a control electrode and interposed in series relation between said circuits, means for deriving a component of voltage variable in accordance with the voltage of said load device, a separate regulated source of constant reference voltage, means for deriving a component of voltage of constant magnitude from said separate source, a multi-stage direct current amplifier including in each stage an electronic tube having an anode, a cathode and a control grid and having an input circuit for the first stage of said amplifier and an output circuit for the last stage of said amplifier, the electronic tube of said first stage having its anode-cathode circuit connected across said separate source and its control grid connected to be energized in accordance with the difference between said components of voltage, a second separate source of voltage, the electronic tube of the last stage of said amplifier having its anode-cathode circuit connected to be energized from said second separate source and its control grid connected to be energized in accordance with the variations in the current of the anode-cathode circuit of said first stage electronic tube, and means for connecting the output circuit of said amplifier to the control electrode of said impedance regulating tube so as to compensate for any variation in the voltage of said load circuit.

8. In a voltage regulating system, a source of high voltage direct current, a variable load device connected to be energized from said source and characterized by being subject to random momentary short circuits, a variable impedance regulating electronic tube having a control electrode and interposed in series relation between said source and said load device, means for deriving a component of voltage variable in accordance with the voltage of said load device, a separate regulated source of constant reference voltage, means for deriving a component of voltage of constant magnitude from said separate source, means including a direct current amplifier for controlling the impedance of said regulating electronic tube, said amplifier having an output circuit and an input circuit including an electronic tube having a pair of control grids, means for energizing one of said control grids in accordance with the difference between said components of voltage, a voltage divider circuit comprising a resistor and a glow tube connected across said source of constant reference voltage, means for interconnecting the junction of said resistor and glow tube to the other of said control grids, said glow tube having a voltage of ionization of such value that said glow tube is rendered non-conductive upon short circuit of said load circuit and a voltage of reionization higher than the value of voltage to be maintained across said load circuit, and means for coupling the output circuit of said amplifier to the control electrode of said regulating electronic tube.

References Cited in the file of this patent
UNITED STATES PATENTS

| Number | Name | Date |
|---|---|---|
| 2,210,732 | Rumpel | Aug. 6, 1940 |
| 2,316,577 | Ford | Apr. 13, 1943 |